Nov. 14, 1939.  M. P. PALSSON  2,179,598

HARPOON SPOON AND PLUG

Filed Feb. 2, 1938

INVENTOR:
Magnus P. Palsson,
BY: Christian R. Nielsen
ATTORNEY.

Patented Nov. 14, 1939

2,179,598

UNITED STATES PATENT OFFICE 2,179,598

HARPOON SPOON AND PLUG

Magnus P. Palsson, Seattle, Wash.

Application February 2, 1938, Serial No. 188,360

11 Claims. (Cl. 43—6)

The invention relates to fishing equipment, and has for an object to provide a harpoon device in which novel features of construction and function are attained. It is an important purpose of the invention to present a more merciful fishing means than the ordinary hook and line, by using in addition, means to shorten the suffering of the fish. At the same time, it is a purpose to reduce the liability of loss of valuable fishing equipment by breakage of lines, entanglement with submerged objects, and otherwise through the exertions of the fish. It is also a purpose to make more certain the catching of a fish when it has struck, or when nibbling the bait on a hook.

It is a special purpose to utilize a plate to serve as the mounting for a harpoon gun and operative and control means, in such form as to adapt it to use on the usual light lines used with rods and hand reels for small fish as well as large ones. That is to say, the device is useful for catching fish ranging from three or four pounds upward.

Another object is to present a novel coordination of the mounting plate and removable casing sections so as to permit ready removal and replacement of the covering without requiring the use of tools.

Another important object is to present a novel construction for enabling the release of the harpoon element from tension of a firing means with ease and safety; for restoration of the tension device to operative condition; to provide a novel mounting of the harpoon and a novel construction of the harpoon head.

Additional objects, advantages and features of invention reside in the construction, arrangement and combination of parts involved in the embodiment of the invention as will be understood from the following description and accompanying drawing, wherein Figure 1 is a perspective view of the device.

Figure 5:
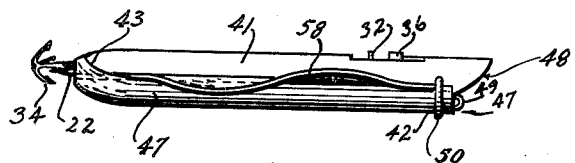
Figure 6:
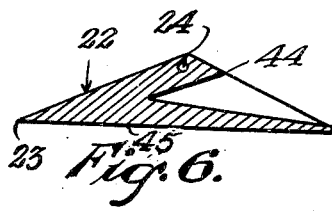
Figure 6 is an enlarged sectional view of the head employed with the harpoon.
Figure 1:
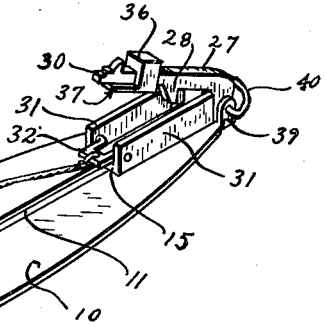
Figure 2:
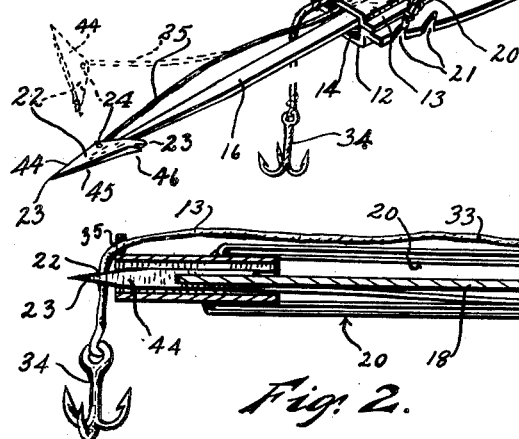
Figure 2 is a longitudinal sectional view of the device in set position, illustrating only a front portion of the case parts.
Figure 2:
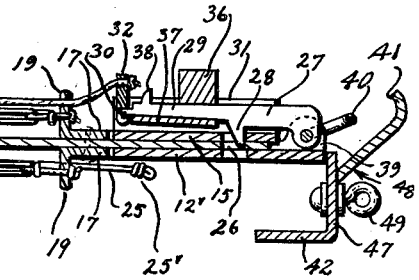

There is illustrated a fish lure device comprising an elongated base plate 10, the body of which is planiform, but which may have its edges bent as shown in Figure 5, to cause the device to move in the ways familiar in spoon bait devices. This plate is formed with a longitudinal medial slot 11 extending from near its head end to a point near its tail end, and the portions of the plate joining the two sides across this slot at the head and tail ends are recessed to form channels 12—12' respectively in alinement with the slot. The tail channel is covered by a corresponding oppositely recessed piece 13, affording together sleeve-like portions 14, the channel at the head being covered by a flat plate 15 accommodating thereunder the butt of a harpoon 16 formed of flat stock in the present instance (although other forms of stock may be used) slidably fitted in the slot 11. The harpoon has a pair of guide cross pieces 17 secured thereto a distance from the butt, these pieces being positioned on opposite sides of the shank 18 of the harpoon and extending over the plate 10 so as to hold the shank in the slot at all stages of reciprocation of the harpoon. Each cross piece has an outturned flange 19 thereon at right angles to the plate 10 apertured and having string or other fastening means engaged in the apertures and connected to rubber bands or other contractile elements 20 engaged removably in slots 21 in the edges of the plate 10, putting the bands under tension tending to force the harpoon shank toward the outer limit of its movement. One tension device is connected with each end of each flange 19, there being thus four bands. The slots 21 are formed in the lateral edge of the plate 10 and open at this edge, each slot being extended diagonally inward from the edge of the plate and forward toward the axis of the device. The two rubbers on each side of the slot are connected by a cord, which is set in one of the slots for operative effect, and may be adjusted into slots 21 further forward to lessen tension or in slots further to the rear to increase the tension of the bands.

The harpoon may be of any conventional form, but in the present instance includes a socketed head 22 set removably and loosely on the tapered point of the shank. The head is of triangular shape, the angles of the junctions of the base and two sides forming points 23 of the head, the socket being in one of these sides, and an aperture 24 being formed within the angle at the junction of the sides, in which aperture a flexible steel wire 25 is connected, longer than the shank 18. When the head penetrates a fish body it may be drawn from the shank 18 by the motions of the fish and will remain connected to my device by the wire 25 which will cause the head 22 to assume a position transverse to the direction of pull communicated through the wire. The wire may be engaged slidably through the flange 19 of one of the cross pieces 17, a stop 25' being formed on the end of the wire to limit movement of the head 22 from the shank 18, as shown. The wire has just enough slack when the head is in place on the shank 18 to permit the head to be detached. This construction will minimize movement of the device when a fish is harpooned.

Means is provided to hold the harpoon in set position releasable by a bait carrying trigger connection. For this purpose the harpoon is formed with an eye 26 near the butt adapted to aline with an aperture in the plate 15 when the harpoon is fully retracted. Pivoted on the end of the plate 10 beyond the position of the butt when retracted there is a detent lever 27 having a sear 28 arranged to project through the aperture of the plate 15 and through the eye of the harpoon shank when the lever is moved toward the harpoon fully. The lever is extended further to the rear forming an elongated arm 29 at the extremity of which a bill 30 is formed for a purpose to be described. The plate 15 has upturned flanges 31 at the sides, between which the detent lever works, and between the rear parts of these flanges a trigger 32 is pivoted consisting of a substantially U-shaped member having the ends of its arms turned outward as trunnions and set in apertures in the flanges 31 constituting the pivot of the trigger. The bill 30 is freely movable into and out of the bight of this trigger when the latter is swung rearwardly, but when the trigger is swung forwardly to a position at right angles to the plane of the plate 10, it swings over the bill 30, which is thus held thereunder against outward or releasing movement with relation to the harpoon shank. The outer part of the trigger is apertured and has connected thereto a snell or other flexible connection 33 to the outer end of which a hook 34 is attached, located close to the tail end of the plate 10. The snell is passed loosely through an aperture in the flange 19 at the same side of the plate 10 with the trigger, and any other guiding means may be provided as discretion may dictate. In the present instance, an eye 35 is formed on the piece 13 through which the snell is passed, so that the hook is held near the head of the harpoon when retracted. The head is of such length and the slack in the wire 25 is such that if the head becomes disengaged from the point of the harpoon it is still in the sleeve 14 in position to receive the point of the harpoon if the latter is shot.

Figure 4:
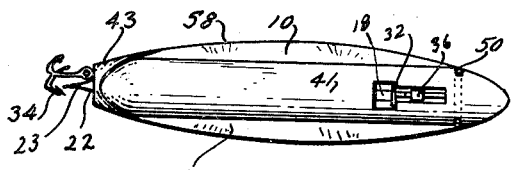
Figures 4 and 5 are a top view and side elevation, respectively, of the device with the case parts in place, and illustrating a modified form of base plate.
Figure 3:
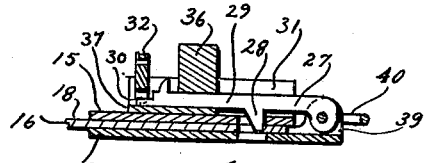
Figure 3 is a detail from the right hand end of Figure 2 showing the parts in safety positions.

Slidable on the arm 29 there is a safety slide 36, having a flat tongue 37 extended rearwardly therefrom beneath the arm 29, and adapted to pass snugly under the trunnions of the trigger when the slide is moved rearwardly on the arm 29 while the detent is in set position (see Figure 3). When the tongue is so engaged under the trigger, the slide and the detent are prevented from moving to released position. The edge of the sear engaged by the edge of the eye of the harpoon shank is so formed that pressure of the harpoon against the sear tends to throw the detent to released position and so, when the safety slide is in inoperative position and the trigger released while the harpoon is in set position, the latter will release the detent and be projected forward forcibly by the rubber bands 20. A nib 38 is formed on the arm 29 to prevent the slide 36 from moving off the arm.

The pivot of the detent includes ears 39 upturned from the material of the plate 10, and the pivot of the detent is also utilized as the swivel of a suspension ring 40, by which the device may be attached to a fishing line.

A case is provided for the article, consisting of two channel shaped pieces 41—42 adapted to be brought into opposition on the top and bottom sides of the plate 10 to form a complete symmetrical cigar-shaped closure except for an opening at the tail end to accommodate the harpoon and snell of the hook 34. To retain the pieces in place without the use of fastenings requiring the use of tools for removal and replacement of the casing parts, I have formed the top case section 41 with extensions 43 from each side at the tail end only, bent inwardly toward each other and together being adapted to partly or completely encircle the end of the section 41, which is adapted to wedge therein when this end is presented together with the plate 10 in the section 42 a distance inwardly of the inturned portions and then moved longitudinally in the section 42 until the section 41 may be brought into snug engagement with the plate 10. The lower case section 42 has a forward end wall 47 which lies forwardly of the ears 39. The top case section 41 has an inclined end wall 48 serving the function of a spoon in addition to closing the forward end of the case section, and it projects beyond the plane of the plate 10 and against the outer face of the wall 47. Fixed in the wall 47 there is an eye 49 by which the device may be attached to a fishing line, if desired. Pivoted on the top section 41 slightly to the rear of the walls 47 and 48 there is a bail or lock ring 50 of a size and shape to swing and engage over the end portion of the section 42 with a snug fit, so as to hold these ends of the case pressed against the plate 10. Consequently, when the bail is so engaged the case is securely held in place on the device, but may be readily removed manually by swinging the bail 50 to unlocked position. The top case section affords a clearance thereunder at the head part to permit proper movement of the detent and trigger, and is suitably slotted to permit the top part of the slide 36 to be manipulated, and over the trigger, to permit the latter to be set without removing the case, when desired. The undulations 58 first referred to in the plate 10 are formed in portions which project laterally beyond the edges of the case sections 41—42, so that the latter may be formed with opposed edges which terminate in parallel planes.

It will be seen that all these parts assembled as described present, as a whole, a symmetrical body which may be handled with great safety and facility with a minimum liability of fouling the operative mechanism.

The blade head 22 of the harpoon has its socket formed in one of the short sides 44 at such angle to the base or long edge 45 of the blade that the latter edge extends diagonally across the axis of the shank. This edge 45 is slightly flattened, so that it causes the blade to follow a diagonal course in penetrating a body, and at its rear point is formed with outturned points 46 projecting slightly from the edge 45, so that in case the blade tends to be drawn from a fish which it has penetrated, the points 46 will cause it to turn from the path by which it entered, oppose withdrawal and cause the head to adjust itself transverse to such path and also transverse to the wire 25.

In the use of this appliance, it may be employed either with or without the casing in place, and in the event that the casing is omitted, the eye ring 40 is used to attach it to the line. To set the device, the harpoon being in released or shot position, the bands 20 are disengaged from the notches 21, and the shank adjusted in the head 22 and thrust rearwardly until its eye 26 falls under the sear 28 which is engaged therein by pressure of the finger on the slide 36 while the latter is pushed rearwardly so that its tongue 37 engages under the trunnions of the trigger 32. This holds the bill 30 of the detent at a much lower level than necessary to clear the trigger as the latter is later raised and swung forwardly over the bill. The safety slide is now left in safety position while the rubbers are stretched and engaged in the notches 21 at such distance as required to produce the desired tension for harpooning the particular fish to be angled for. Small fish will, as a rule, require less stress on the rubbers. The hook being suitably baited, and the device attached properly to a line, if no case is used, the trigger is set and held in set position while the slide 36 is drawn forwardly. The pressure of the harpoon against the sear will then raise the bill until it engages in the bight of the trigger, and the end of the tongue 37 is thus raised so that it cannot slide under the trunnions of the trigger casually, but if the slide is pressed rearwardly, the tongue 37 will strike against the trunnions and so be stopped without locking the device in safety position.

The device is now dropped overboard, or cast, being attached to a proper line. When a fish takes the bait, the trigger is pulled off the bill 30, allowing the pressure of the harpoon against the sear 28 to raise the detent and clearing the harpoon so that the latter is projected forcibly toward the rear through the sleeve-like passage 14. The bait being held close to the path of the head 22, the fish will be struck thereby, and secured by the functioning of the head 22 as described in addition to the possibility that it may be caught by the hook 34.

Owing to the exposure of the parts to fouling when no case is provided, it will usually be desirable to apply the case parts, and this is done after setting of the device as described, but before moving the slide 36 from safety position, by applying the section 41 first to the top side of the plate 10, and then applying the section 42, inserting the tail end of the section 41 and plate 10 into the intermediate portion of the section 42 and sliding them toward the rear part of section 42 while swinging the forward parts of the two casing sections toward each other. The section 41 with plate 10 in this way finally comes to rest in symmetrical relation to section 42 with the inclined wall 48 engaged forwardly of the wall 47, ready for the bail 50 to be moved to locked position, which is now done, completing the assembly of the device. The plug may now be attached to the line by means of the eye 49, if not already connected. By inserting the fingernail or a stick, or nail into the slot of the case section 41, the slide 36 may now be moved to disengaged position while the trigger is held in set position, and as described the harpoon will be held by the trigger alone ready for fishing. It may now be dropped, thrown, or cast and angling conducted in accordance with usual practices.

While I have described one specific construction of the invention, I do not regard it as limited to the exact details set forth and shown, except as hereinafter claimed, and modifications of construction and arrangement may be made within the scope of these claims without departing from the spirit of the invention.

I claim:

1. In a device of the character described, a body, a harpoon slidable therein, bait operated trigger means to hold the harpoon in retracted position, resilient contractile elements connected to the harpoon and manually releasable means to anchor the contractile elements to the body at a distance from the connection with the harpoon when in set position.

2. A device of the character described comprising a plate having a longitudinal slot opening on the rear end, a harpoon slidable therein with a point projectable through said open end of the slot, elastic contractile elements connected to the harpoon, near its inner end, slots on the rear part of the plate, means on the outer parts of said contractile elements to engage removably in said slots under tension to project the harpoon from retracted position, and hook-operated trigger means to hold the harpoon in retracted position.

3. The structure of claim 1 in which said body comprises a plate having notches opening on the rear end portion inclined forwardly toward their inner ends, constituting part of said manually releasable means, and said contractile members having means thereon to engage removably in said slots as part of said manually releasable means.

4. The structure of claim 1 in which said body comprises a plate having a longitudinal slot therein open at the rear end of the plate, said harpoon being set in the slot and having transverse members on opposite sides of its shank which extend across the slot and are slidable against the respective faces of the plate, means at the rear of the plate to hold the harpoon in the slot, said contractile members being connected to the transverse members.

5. The structure of claim 1 in which said body comprises a plate having a longitudinal slot therein open at the rear end of the plate, said harpoon having a separable head on its forward end, flexible lost-motion means to connect the head to the harpoon body, a sleeve portion formed on the plate to retain the head in operative relaiton to the harpoon when in set position.

6. The structure of claim 2 in which a casing engages over the operative parts, comprising two sections, one on each side of the plate and abutting the same snugly, said plate having lateral edge portions projected beyond the casing and shaped in curved forms for the purposes described.

7. The structure of claim 1 in which said trigger means comprises a detent pivoted for movement toward and away from the harpoon, said harpoon having an eye therein, said detent having a sear to engage in the eye at the inner limit of movement of the detent and having a projected bill element, a trigger mounted on the plate and movable to engage over the bill, a slide on the detent having a projecting tongue and said body and tongue having an aperture to receive the tongue therethrough when the slide is moved to one limit of movement and the detent is in set position.

8. In a harpoon of the character described a longitudinal shank, a head removably engaged thereon consisting of a body having a socket in one side adapted to receive the end of the shank at an angle to one side, said side having an outturned point thereon near the end adjacent the socket, and retaining means separate from the shank connected pivotally to the head.

9. The structure of claim 2 in which complementary case sections are removably set against each side of said plate and mutually interlock separably in operative relation with each other and said plate, and manual fastening means to connect the sections.

10. The structure claim 2 in which complementary case sections are formed, removably set in abutment with the plate at opposite sides to present a symmetrical case, the sections having tapered end portions on one end, and one section having at its tapered end portion extended sides embracing and adapted to wedge on the other section and engage around said plate, the other end of the said one case section engaging over a portion of the plate and the other section engaging over a portion of the plate at the opposite end thereof, and fastening means to clamp the sections together.

11. A harpoon device comprising a mounting, a harpoon slidable thereon, means to limit outward movement of the harpoon, a head socketed on the outer end of the harpoon, and a flexible connection between the head and the harpoon having a length more than that between the head and said means to limit movement of the harpoon when the parts are in normal relation.

MAGNUS P. PALSSON.